US009363297B2

(12) United States Patent
Gorti et al.

(10) Patent No.: US 9,363,297 B2
(45) Date of Patent: *Jun. 7, 2016

(54) METHOD AND APPARATUS FOR DELIVERING IP MULTIMEDIA SUBSYSTEM SERVICES

(75) Inventors: Sreenivasa Gorti, Austin, TX (US); David Wolter, Austin, TX (US); Anil Doradla, Wilmette, IL (US)

(73) Assignee: AT&T Intellectual Property I, LP, Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/557,329

(22) Filed: Jul. 25, 2012

(65) Prior Publication Data

US 2012/0294196 A1   Nov. 22, 2012

Related U.S. Application Data

(63) Continuation of application No. 11/539,792, filed on Oct. 9, 2006, now Pat. No. 8,255,549.

(51) Int. Cl.
*H04L 29/06* (2006.01)
*H04L 29/08* (2006.01)
*H04W 28/06* (2009.01)
*H04W 80/04* (2009.01)

(52) U.S. Cl.
CPC ............ *H04L 65/1016* (2013.01); *H04L 67/16* (2013.01); *H04W 28/06* (2013.01); *H04W 80/04* (2013.01)

(58) Field of Classification Search
CPC ............. H04L 29/08144; H04L 29/06; H04L 65/1016; H04L 67/16; H04W 28/06; H04W 80/04

See application file for complete search history.

(56) References Cited

U.S. PATENT DOCUMENTS

| 7,031,706 | B2 |   | 4/2006  | Tuohimetsa et al.          |
|-----------|----|---|---------|----------------------------|
| 7,466,810 | B1 | * | 12/2008 | Quon et al. ....... 379/201.01 |
| 7,535,915 | B2 | * | 5/2009  | Collins ............ 370/410    |
| 2003/0224781 | A1 | * | 12/2003 | Milford et al. ...... 455/426.1 |
| 2004/0146040 | A1 |   | 7/2004  | Phan-Anh                    |
| 2005/0193057 | A1 | * | 9/2005  | Owen et al. ......... 709/203 |
| 2006/0010236 | A1 | * | 1/2006  | Meiser et al. ....... 709/226 |
| 2006/0089999 | A1 |   | 4/2006  | Xiang                       |
| 2006/0090001 | A1 | * | 4/2006  | Collins ............ 709/230 |
| 2006/0121894 | A1 | * | 6/2006  | Ganesan ........... 455/432.1 |
| 2007/0053330 | A1 | * | 3/2007  | Stafford et al. ..... 370/338 |
| 2007/0142033 | A1 | * | 6/2007  | Deas et al. ......... 455/411 |
| 2007/0282879 | A1 |   | 12/2007 | Degenkolb et al.            |
| 2007/0286170 | A1 | * | 12/2007 | Khan et al. ......... 370/356 |
| 2008/0005295 | A1 | * | 1/2008  | Burroughs et al. .... 709/223 |
| 2008/0066155 | A1 | * | 3/2008  | Abraham ............. 726/3   |
| 2008/0077654 | A1 |   | 3/2008  | Kuan et al.                 |
| 2008/0126230 | A1 | * | 5/2008  | Bellora et al. ...... 705/32  |
| 2009/0083426 | A1 | * | 3/2009  | Cagenius ........... 709/227 |

* cited by examiner

*Primary Examiner* — Khaled Kassim
(74) *Attorney, Agent, or Firm* — Gustin & Gust, PLC; Joseph P. Hrutka

(57) ABSTRACT

A method and apparatus for delivering IP Multimedia Subsystem (IMS) services is disclosed. An apparatus that incorporates teachings of the present disclosure may include, for example, a system having an aggregator element that aggregates a number of IMS services, and a presentation element that presents a web page with the aggregated IMS services. Additional embodiments are disclosed.

15 Claims, 4 Drawing Sheets

200

214

METHOD AND APPARATUS FOR DELIVERING IP MULTIMEDIA SUBSYSTEM SERVICES

RELATED APPLICATION

This application is a continuation of and claims priority to U.S. patent application Ser. No. 11/539,792, filed Oct. 9, 2006, the disclosure of which is incorporated herein by reference in its entirety.

FIELD OF THE DISCLOSURE

The present disclosure relates generally to communication systems, and more specifically to a method and apparatus for delivering IP Multimedia Subsystem (IMS) services.

BACKGROUND

As IP Multimedia Subsystem (IMS) Services grow in popularity, an increasing number of data and multimedia applications are envisioned for fixed and mobile IP-based communication devices. Currently, each IMS application establishes a new user interface at a terminal device. This approach is similar to the days when each software application essentially had its own look and feel, thereby resulting in the creation of various windowing systems to address this problem.

Today's IMS services are deployed according to a static model. That is, communication devices operating in a wired or wireless access network (WAN) such as shown in the prior art system of FIG. 1 have one or more IMS clients and applications loaded on them that are pre-provisioned with credentials (e.g., user name/password, HTTP digest, etc.). Each IMS client is supplied by a corresponding IMS service provider. Accordingly, each of these clients is pre-configured to point to a particular IMS service provider. The end user of a communication device utilizing these clients is thereby forced to subscribe with each corresponding IMS service provider on a fixed subscription.

As a result of this static model there is no easy way for a roaming user to subscribe to an IMS service on a temporary basis. A need therefore arises for a method and apparatus that delivers IMS services.

DETAILED DESCRIPTION OF THE DRAWINGS

Embodiments in accordance with the present disclosure provide a method and apparatus for delivering IP Multimedia Subsystem (IMS) services.

In a first embodiment of the present disclosure, a system can have an aggregator element that aggregates a plurality of IP Multimedia Subsystem (IMS) services, and a presentation element that presents a web page with the aggregated IMS services.

In a second embodiment of the present disclosure, a terminal device can have a communications element for establishing communications with a system that conveys to the terminal device a web page comprising an aggregation of IP Multimedia Subsystem (IMS) services.

In a third embodiment of the present disclosure, an access point can have a communications element for establishing communications with a terminal device and for conveying to said terminal device a web page comprising an aggregation of IP Multimedia Subsystem (IMS) services supplied by a broker of IMS services.

In a fourth embodiment of the present disclosure, a method can have the step of an IP Multimedia Subsystem (IMS) service provider sharing revenue with a broker that aggregates IMS services of one or more IMS service providers.

In a fifth embodiment of the present disclosure, a method in which a broker aggregates IMS services of one or more IMS service providers for presentation to one or more terminal devices.

Other components and techniques that can be utilized in the exemplary embodiments are described in U.S. patent application Ser. No. 11/539,801, filed Oct. 9, 2006, by Gorti et al., entitled "Method and Apparatus for Delivering Portal Services", the disclosure of which is incorporated herein by reference in its entirety.

Figure 2:
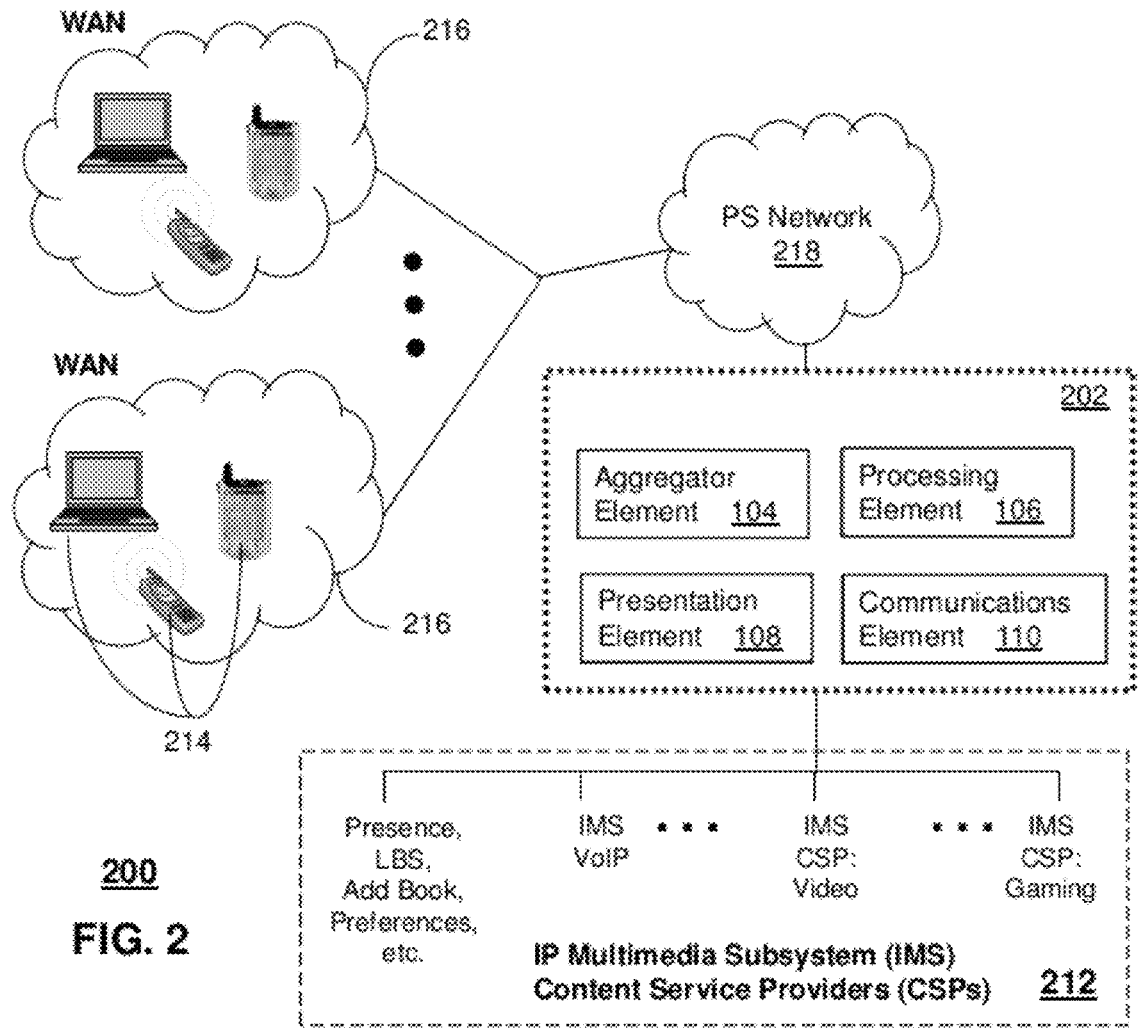
FIG. 2 depicts an exemplary embodiment of a communication system.

FIG. 2 depicts an exemplary embodiment of a communication system 200. The communication system 200 can comprise a number of Wireline or Wireless Access Networks (WANs) 216 which support any number of access point technologies such as Public Switched Telephone Network (PSTN), xDSL, cable, WiFi, WiMAX, cellular (e.g., GSM, CDMA, UMTS, etc.), Bluetooth, software defined radio (SDR), ultra wide band (UWB), and so on. In one of several embodiments, WANs 116 can represent, for example, WiFi hotspots established by retailers to draw patrons to their establishment for additional business.

Terminal devices 214 can represent single or multimode roaming communication devices capable of interfacing to the WANs 216 by wire or wirelessly. The terminal devices 214 can represent a number of embodiments including without limitation computing devices (e.g., a laptop computer), a cellular phone with multimode capability (e.g., WiFi and cellular), and a personal digital assistant (PDA) with wireless capability. Accordingly, an end user of a terminal device 214 can operate from or roam into a WAN 214 of a residence or commercial enterprise and utilize wireless or wireline communication services of the communication system 200.

The WANs 216 can be coupled to a packet-switched (PS) network 218 (e.g., an IP, Frame Relay, Asynchronous Transfer Mode or ATM, Multi-protocol Label Switching or MPLS). The PS network 118 can be managed by, for example, a Tier 1 Internet Service Provider (ISP) utilizing common packet-switched routing technologies. A system 102 can be coupled to the PS network 218 to supply aggregated IP Multimedia Subsystem (IMS) services to roaming terminal devices 214 by way of the WANs 216.

IMS is a standardized Next Generation Network (NGN) architecture that converges mobile and fixed multimedia services. IMS can support Voice over IP (VoIP) based on a 3GPP ($3^{rd}$ Generation Partnership Project) standardized implementation of Session Initiation Protocol (SIP), and can operate over a standard Internet protocol (IP) network. Existing phone systems utilizing packet-switched or circuit-switched techniques can be supported by IMS. Accordingly, IMS aims to provide current and future communication services that the Internet can support. In this way, IMS gives service providers the ability to control and charge for services in an integrated fashion. To achieve these objectives, IMS uses open standard protocols defined by the Internet Engineering Task Force (IETF).

System 202 can be managed by an IMS services broker or aggregator. System 202 can thus serve as a clearing house for IMS service providers targeting consumers that may not be readily accessible in networks managed by said providers. System 202 can be operated by an independent broker, or can be managed by the service provider of the PS network 218. In some instances, the broker can be associated with one or more WANs 216. Consequently, the broker managing operations of system 202 can be any of the parties providing communication services in FIG. 2. Due to the nature of terminal devices 214 roaming in and out of WANs 216, IMS services offered by system 202 can be temporary. That is, while the terminal device 216 is in the vicinity of a WAN 216 it can receive IMS services it has temporarily subscribed to. Once the terminal device 216 departs from the WAN 216 or the services subscribed to have expired according to a given time limit, the terminal device 216 must re-subscribe to acquire IMS services within the same or new WAN 216.

To accomplish the foregoing activities, system 202 comprises an aggregator element 204, a processing element 206, a presentation element 208 and a communication element 210. The aggregator element 204 serves to aggregate IMS services from one or more IMS service providers (see reference 212) as a web service. The processing element 206 can represent a computing device (such as a scalable server) that manages operations of system 202. The presentation element 208 serves to present a web page with sub-frames showing the aggregated IMS services of one or more IMS service providers to roaming terminal devices 214 requesting service from system 202. IMS services can be bundled in any desirable manner. For instance, each IMS service can be presented with its corresponding IMS service provider, or IMS services can be logically bundled across more than one IMS service provider to provide, for example, a full service package (voice, video and data). The aggregator element 204 and the presentation element 208 can be an integral part of each other. The communication element 210 provides a means of communication between the IMS service providers and the PS network 218 utilizing common packet-switched technologies.

Figure 3:
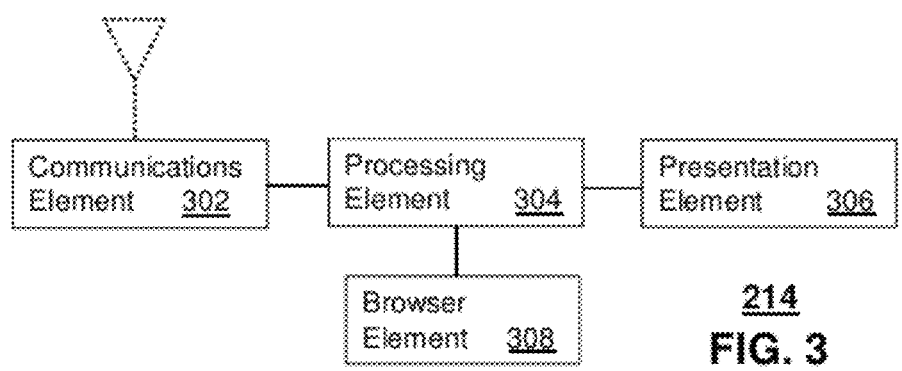
FIG. 3 depicts an exemplary embodiment of a terminal device operating in the communication system.

FIG. 3 depicts an exemplary embodiment of a terminal device 214. Terminal devices 214 can comprise a communication element 302, a processing element 304, a presentation element 306, and a browser element 308. The communication element 302 can comprise common communications technology to support wireline and/or wireless communications conforming to the communication protocols previously described for the WANs 216. The processing element 204 can comprise a computing device such as a microprocessor and/or Digital Signal Processor (DSP) for managing operations of the terminal device 214. The presentation element 306 can comprise a common display such as a Liquid Crystal Display (LCD) accompanied by an audio system for presenting visual and/or audio signals to an end user of the terminal device 214. The browser element 308 can represent a common browser for navigating through services provided by the Internet.

The foregoing elements of system 202 and the terminal device 214 can be implemented with common software and/or hardware techniques.

Figure 4:
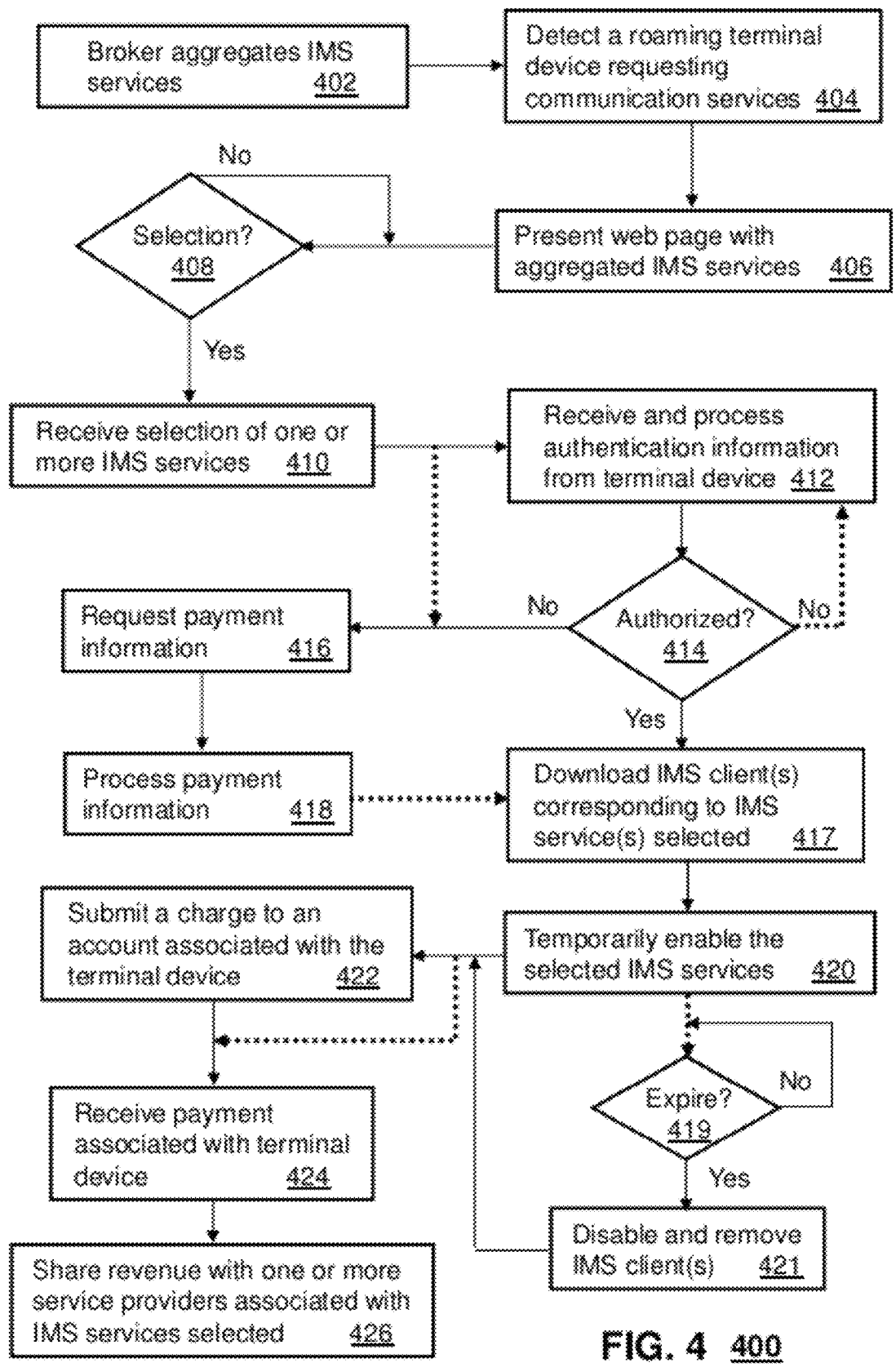
FIG. 4 depicts an exemplary method operating in portions of the communication system.

FIG. 4 depicts an exemplary method 400 operating in portions of the communication system 200. Method 400 begins with step 402 in which the system 202 aggregates a number of IMS services of one or more IMS service providers according to common aggregation techniques. This step can occur once or periodically as IMS services are added or removed by the broker of system 202. In step 404, system 202 detects a terminal device 214 roaming into a WAN 216. The detection step can represent, for example, a WiFi access point that detects the presence of a terminal device 214 in its network and submits a notification to system 202. Once detected, the system 202 transmits a web page with the aggregated IMS services which is presented at the terminal device 214 by the browser element 308. The web page can include advertisements, hyperlinks to the IMS services as well as instructions for how to enable any one or more of the IMS services offered.

In step 408, system 202 awaits a selection from the terminal device 214. The browser element 308 can provide an end user of the terminal device 214 a means to navigate through the web page to make one or more IMS service selections. Once a selection is made, the terminal device 214 transmits the selected services to system 202 which is intercepted by system 202 in step 410. From step 410, system 202 can proceed to steps 412-414 or 416. In steps 412-414, the terminal device 214 submits authentication information (e.g., login information, personal identification number or PIN code, etc.) to system 202, which processes said information and authorizes, or rejects the request to enable the IMS services selected.

The authorization information supplied by the terminal device 214 can be processed according to a Remote Authentication Dial-In User Service (RADIUS) protocol operating in system 202. RADIUS is an Authentication, Authorization and Accounting (AAA) protocol for network access applications or IP mobility. Steps 412-414 can be used, for example, in cases where the terminal device 214 is an existing subscriber of system 202 for accessing IMS services while roaming in the communication system 200. If the authorization process fails in step 414, system 202 can proceed to step 412 where it can request that terminal 214 retransmit again the authentication information. System 202 can alternatively send a notification to the end user of terminal device 214 indicating that authorization has been denied and that no further attempts are allowed if too many attempts have been made by said user.

Figure 1:
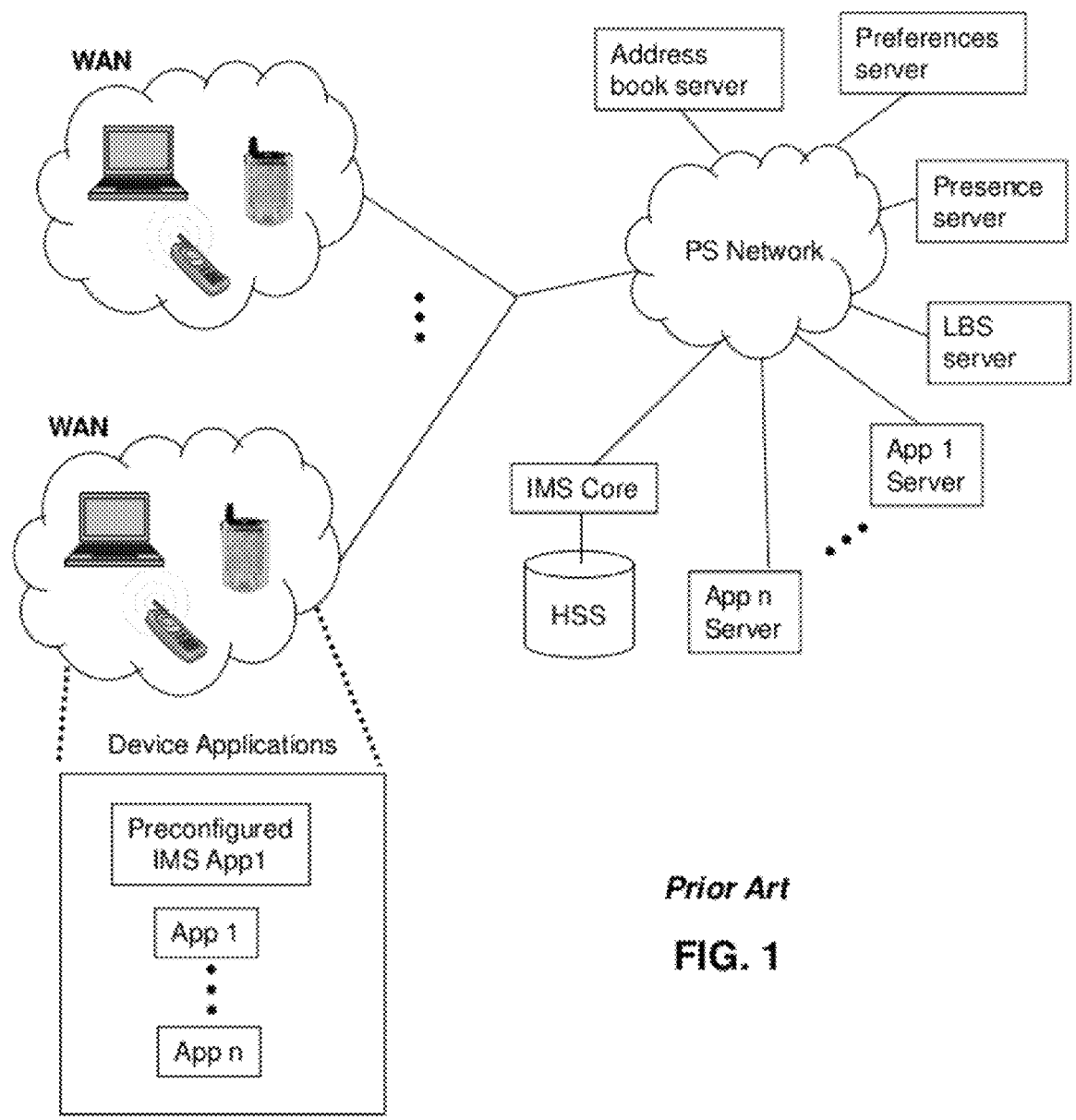
FIG. 1 depicts a prior art system for delivering services to communication devices.

Alternatively or in combination with steps 412-414, the system 202 can submit to the terminal device 214 a request for payment information. The payment information can represent a credit card, or prepaid card information. The end user of the terminal device 214 can enter payment information by common means such as a keypad, or the payment information can be pre-stored in the terminal device 214 and submitted to system 202 on demand. Once the payment information is received by system 202, it is processed in step 418. If valid, the system 202 proceeds to step 417 where it downloads one or more IMS clients (e.g., a SIP client or ActiveX control of the web page) tailored to the one or more IMS services selected in step 410. This embodiment differs with the prior art system of FIG. 1 in that the IMS clients downloaded can be customized or generated by system 102 according to the IMS services selected rather than a static model in which the IMS client cannot change unless an updated IMS client is supplied by the IMS service provider of the prior art system. Moreover, in the present disclosure the IMS client downloaded in step 417 can support the selection of IMS services across several independent IMS service providers. In the prior system of FIG. 1, an IMS client is required for each independently operated IMS service provider.

In the present context, an IMS client can represent for instance a software application that supports some form of IMS data services. For example, one of the IMS clients downloaded to the terminal device 214 in step 417 can be a soft phone for VoIP services. There are innumerable other possible IMS services such as, for example, a video communications service (such as H.323), a gaming service, a music service, a video entertainment service, a location-based service (LBS), a news service, a weather service, a sports service, an education service, or an address book service—just to name a few. An IMS client downloaded to the terminal device 214 can support IMS services from disparate IMS service providers as discussed earlier, or system 202 can generate a number of IMS clients each tailored to a specific IMS service provider according to the IMS services selected for said provider.

Following step 417 the system 202 temporarily enables in step 420 the selected IMS services. After the IMS services are enabled, system 202 in cooperation with the IMS service provider(s) supplying the selected IMS services can negotiate with the WAN 216 a Quality of Service (QoS) for delivering said IMS services to the terminal device 214. The IMS services selected can be, for example, enabled over a 24 hour period with the ability to logoff and on to said IMS services multiple times, or can be limited for use while the terminal device 214 is operating in the WAN 216, and terminated once its roams outside of the WAN's communication range. For example, in steps 419 and 421 system 202 can be programmed to check for the expiration of the IMS services selected. Once the IMS services have expired, system 202 can be programmed to disable said services, and if necessary remove the IMS clients downloaded to the terminal 214.

From this point, system 102 can proceed to step 422 where it can submit a charge to an account associated with the terminal device 214. In this embodiment, charges can be based on usage of IMS services rather than a fixed service fee. Accordingly, system 202 does not submit a charge until it has made an accounting of the usage in time of IMS services and/or other interactions with the IMS services (e.g., content downloads) monitored by system 202. Once payment for said services is received by system 202 or the IMS service provider in step 424, revenue is shared between the broker managing system 2S02 and the IMS service provider associated with the IMS services selected.

It would be evident to an artisan with ordinary skill in the art that the aforementioned embodiments can be modified, reduced, or enhanced without departing from the scope and spirit of the claims described below. For example, as previously described a number of steps in method 300 can be removed or rearranged without departing from the scope of the claims. Similarly, other common payment techniques not mentioned in the present disclosure can be applied without departing from the scope of the claims. Accordingly, the reader is directed to the claims below for a fuller understanding of the breadth and scope of the present disclosure.

Figure 5:
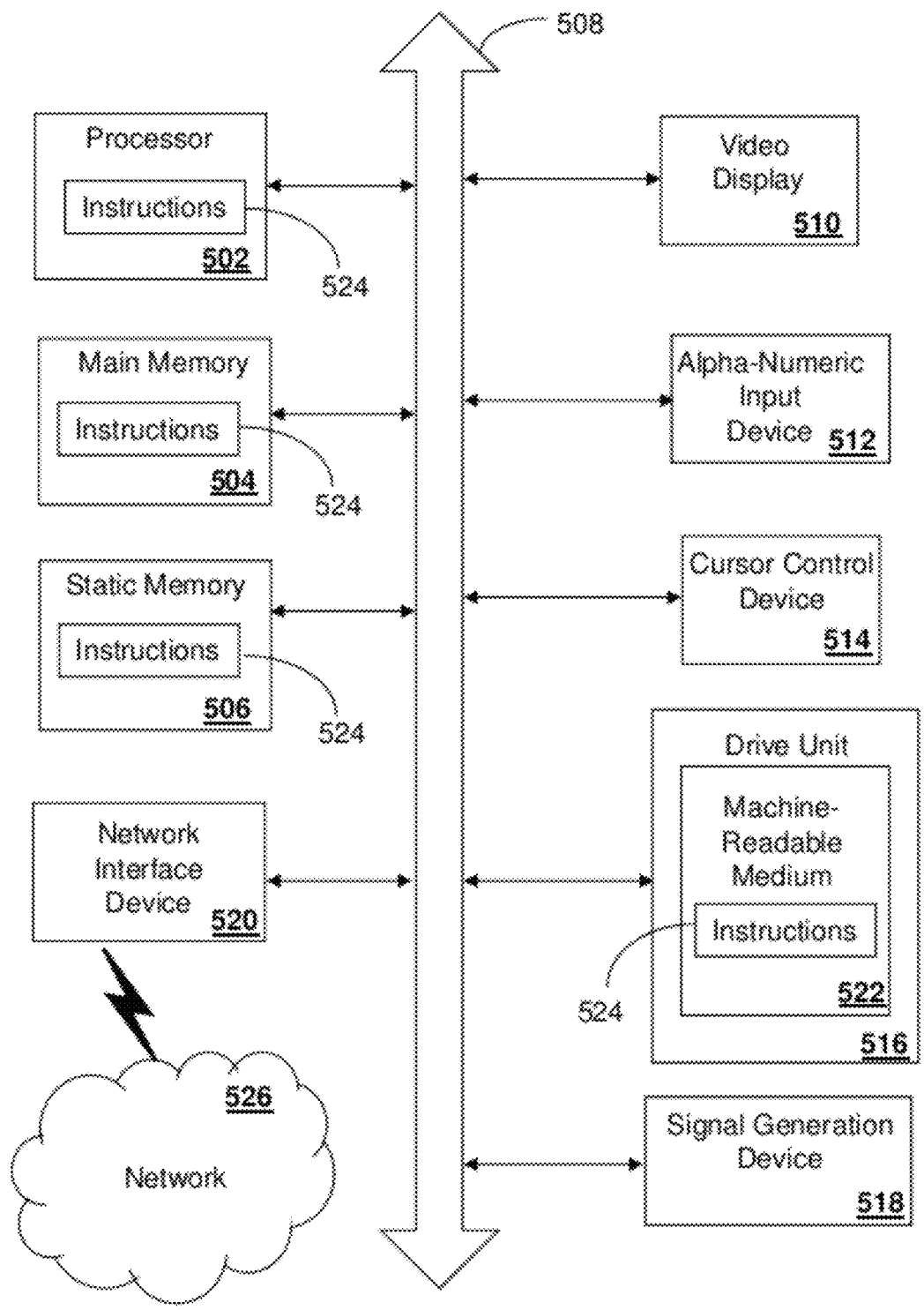
FIG. 5 depicts an exemplary diagrammatic representation of a machine in the form of a computer system within which a set of instructions, when executed, may cause the machine to perform any one or more of the methodologies disclosed herein.

FIG. 5 depicts an exemplary diagrammatic representation of a machine in the form of a computer system 500 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 500 may include a processor 502 (e.g., a central processing unit (CPU), a graphics processing unit (GPU, or both), a main memory 504 and a static memory 506, which communicate with each other via a bus 508. The computer system 500 may further include a video display unit 510 (e.g., a liquid crystal display (LCD), a flat panel, a solid state display, or a cathode ray tube (CRT)). The computer system 500 may include an input device 512 (e.g., a keyboard), a cursor control device 514 (e.g., a mouse), a disk drive unit 516, a signal generation device 518 (e.g., a speaker or remote control) and a network interface device 520.

The disk drive unit 516 may include a machine-readable medium 522 on which is stored one or more sets of instructions (e.g., software 524) embodying any one or more of the methodologies or functions described herein, including those methods illustrated above. The instructions 524 may also reside, completely or at least partially, within the main memory 504, the static memory 506, and/or within the processor 502 during execution thereof by the computer system 500. The main memory 504 and the processor 502 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 524, or that which receives and executes instructions 524 from a propagated signal so that a device connected to a network environment 526 can send or receive voice, video or data, and to communicate over the network 526 using the instructions 524. The instructions 524 may further be transmitted or received over a network 526 via the network interface device 520.

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims.

In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A system, comprising:
    a memory that stores instructions; and
    a processor coupled with the memory, wherein responsive to executing the instructions, the processor performs operations comprising:
        detecting a terminal device roaming in a communication zone of an access point;
        aggregating a plurality of internet protocol multimedia subsystem services supplied by a plurality of disparate service providers to produce aggregated internet protocol multimedia subsystem services, wherein the disparate service providers operate independent of each other, and wherein the aggregated internet protocol multimedia subsystem services include one of a voice over internet protocol service, a video communications service, or a gaming service;
        providing a web page to the terminal device that indicates the aggregated internet protocol multimedia subsystem services, wherein the web page is presented to the terminal device responsive to the detecting of the terminal device;
        receiving a selection from the terminal device of a selected service from the aggregated internet protocol multimedia subsystem services as a selected internet protocol multimedia subsystem service, wherein the selected service is temporarily enabled as a temporary enablement, wherein a charge is submitted to an account associated with the terminal device responsive to a detection of an expiration of the selected service;
        providing to the terminal device an internet protocol multimedia subsystem service tailored to the selected internet protocol multimedia subsystem service; and
        performing an automatic removal of the internet protocol multimedia subsystem service at the terminal device responsive to an expiration of the internet protocol multimedia subsystem service,
        wherein the charge is limited to use of the selected service by the terminal device, wherein the selected service is temporarily enabled for a time period and wherein, during the time period, a quality of service associated with the selected service is negotiated between the plurality of disparate service providers and a provider associated with the access point.

2. The system of claim 1, wherein the operations further comprise determining an amount of usage time associated with the selected service, wherein the charge is based on the amount of usage time.

3. The system of claim 1, wherein operations further comprise receiving payment information for the selected service.

4. The system of claim 3, wherein the operations further comprise submitting billing information to a processing center server according to the payment information.

5. The system of claim 1, wherein the access point corresponds to a cellular access point, and wherein the operations further comprise establishing communications with the terminal device by way of the access point.

6. The system of claim 1, wherein the operations further comprise:
transmitting to the terminal device an internet protocol multimedia subsystem client corresponding to the selected service and authorizing the temporary enablement in response to a valid authentication of the terminal device.

7. A non-transitory, machine-readable storage medium, comprising instructions, wherein responsive to executing the instructions, a processor performs operations comprising:
monitoring for roaming by a terminal device in a communication zone of an access point;
providing a web page to the terminal device displaying aggregated internet protocol multimedia subsystem services as a selected internet protocol multimedia subsystem service, wherein the web page is presented to the terminal device responsive to a determination that the terminal device is roaming in the communication zone, wherein the aggregated internet protocol multimedia subsystem services are supplied by a plurality of disparate service providers, wherein the disparate service providers operate independent of each other, and wherein the aggregated internet protocol multimedia subsystem services include one of a video communications service, a gaming service, a location-based service, or a sports service;
receiving a selection from the terminal device of a selected service from among the aggregated internet protocol multimedia subsystem services, wherein the selected service is temporarily enabled as a temporary enablement, wherein a charge is submitted to an account associated with the terminal device according to the selected service responsive to a detection of an expiration of the selected service, and wherein the charge is limited to use of the selected service by the terminal device; and
providing to the terminal device an internet protocol multimedia subsystem service tailored to the selected internet protocol multimedia subsystem service,
wherein the internet protocol multimedia subsystem services are configured for automatic removal from the terminal device responsive to expiration of the selected service,
wherein the selected service is temporarily enabled for a time period and wherein, during the time period, a quality of service associated with the selected service is negotiated between the plurality of disparate service providers and a provider associated with the access point.

8. The non-transitory, machine-readable storage medium of claim 7, wherein the aggregated internet protocol multimedia subsystem services are configured for aggregation by a broker, and wherein the selected service is temporarily enabled via provisioning of an internet protocol multimedia subsystem client corresponding to the selected service.

9. The non-transitory, machine-readable storage medium of claim 8, wherein the access point transmits to the terminal device the internet protocol multimedia subsystem client corresponding to the selected service and authorizes the temporary enablement in response to a valid authentication of the terminal device.

10. The non-transitory, machine-readable storage medium of claim 7, wherein the access point comprises a Wireless Fidelity access point.

11. A method, comprising:
providing, by a system comprising a processor, a graphical user interface for presentation at a terminal device, wherein the graphical user interface describes aggregated internet protocol multimedia subsystem services supplied by a plurality of disparate service providers, wherein the disparate service providers operate independent of each other; and
receiving a selection of a selected service from among the aggregated internet protocol multimedia subsystem services as a selected internet protocol multimedia subsystem service, wherein the aggregated internet protocol multimedia subsystem services include one of a voice over internet protocol service, a video communications service, or a gaming service wherein the selected service is configured for automatic removal from the terminal device, wherein a charge is submitted to an account associated with the terminal device according to the selected service responsive to a detection of the automatic removal of the selected service from the terminal device; and
providing to the terminal device an internet protocol multimedia subsystem service tailored to the selected internet protocol multimedia subsystem service,
wherein the charge is limited to use of the selected service by the terminal device, wherein the selection is received by the processor from the terminal device, wherein the selected service is temporarily enabled for a time period,
wherein the graphical user interface is provided to the terminal device responsive to a detection of the terminal device roaming in a communication zone of an access point, and
wherein during the time period, a quality of service associated with the selected service is negotiated between the plurality of disparate service providers and a provider associated with the access point.

12. The method of claim 11, wherein the access point comprises a cellular base station.

13. The method of claim 11, wherein the graphical user interface is a web page presented by a web browser of the terminal device.

14. The method of claim 11, further comprising sharing revenue generated by the selected service with a broker and the plurality of disparate service providers.

15. The method of claim 14, wherein the revenue is determined based on monitoring of usage time for only the terminal device utilizing the selected service without any fixed fee arrangement.

* * * * *